United States Patent [19]
Vrijssen

[11] Patent Number: 4,710,673
[45] Date of Patent: Dec. 1, 1987

[54] ELECTRON TUBE ENVELOPE ASSEMBLY WITH PRECISELY POSITIONED WINDOW

[75] Inventor: Gerardus A. H. M. Vrijssen, Eindhoven, Netherlands

[73] Assignee: U.S. Philips Corporation, New York, N.Y.

[21] Appl. No.: 880,941

[22] Filed: Jun. 25, 1986

Related U.S. Application Data

[63] Continuation of Ser. No. 544,765, Oct. 24, 1983, abandoned.

[30] Foreign Application Priority Data

Nov. 2, 1982 [NL] Netherlands ........................ 8204238

[51] Int. Cl.⁴ ........................ H01J 31/00; C03C 27/02

[52] U.S. Cl. .................................... 313/477 R; 65/43; 65/59.1

[58] Field of Search .................... 313/474, 477 R, 365, 313/384; 495/43, 25; 45/59.1, 42, 43, 59.24, 59.25, 59.26

[56] References Cited

U.S. PATENT DOCUMENTS

| | | | |
|---|---|---|---|
| 1,833,487 | 11/1931 | Heany | 65/42 |
| 1,871,371 | 8/1932 | Jackson | 65/59.24 |
| 3,243,627 | 3/1966 | Vine | 313/102 |
| 3,519,161 | 7/1970 | Powell et al. | 65/59.25 |
| 3,543,383 | 12/1971 | Freeman et al. | 29/470.1 |
| 4,066,427 | 1/1978 | Goto | 65/42 |
| 4,142,881 | 3/1979 | Louis | 65/59.26 |
| 4,277,275 | 7/1981 | Kawamura et al. | 65/43 |
| 4,304,586 | 12/1981 | Vrijssen et al. | 65/109 |

FOREIGN PATENT DOCUMENTS

| | | | |
|---|---|---|---|
| 2650907 | 5/1978 | Fed. Rep. of Germany | 313/477 R |
| 29613 | 3/1978 | Japan | 313/384 |
| 30722 | 3/1979 | Japan | 313/384 |
| 1442583 | 7/1976 | United Kingdom | 313/477 R |
| 1442804 | 7/1976 | United Kingdom | 313/477 R |
| 2026469 | 2/1980 | United Kingdom . | |

*Primary Examiner*—S. Leon Bashore
*Assistant Examiner*—Michael K. Boyer
*Attorney, Agent, or Firm*—Marc D. Schechter

[57] ABSTRACT

An electron tube comprising a window having a radiation-sensitive layer. The window is laid on a bearing surface of an envelope normal to the tube axis. There is no sealing material in the seam between the bearing surface and the window. The seam is sealed hermetically by a mass of indium or an indium alloy in which a metal wire is embedded along the circumference of the seam. The wire can be soldered with indium or an indium alloy. The seal is made by locally melting the indium or the indium alloy by a heated ultrasonically vibrating heat transfer member. The heat transfer member traverses the circumference of the seam.

1 Claim, 3 Drawing Figures

ELECTRON TUBE ENVELOPE ASSEMBLY WITH PRECISELY POSITIONED WINDOW

This is a continuation of application Ser. No. 544,765, filed Oct. 24, 1983 now abandoned.

BACKGROUND OF THE INVENTION

The invention relates to an electron tube. The tube has a tubular envelope portion which at one end has a bearing surface normal to the axis of the tube. A window having a radiation-sensitive layer thereon bears on the bearing surface. There is no sealing means at the scan between the window and the bearing surface. Instead, the seam is sealed hermetically by a mass of indium or an indium alloy.

The invention further relates to a method of manufacturing this electron tube.

Such an electron tube is disclosed in U.S. Pat. No. 3,243,627. The envelope is connected to the window and the seam is sealed by molding a ring of indium or a eutectic alloy of tin and indium in a mold placed around the envelope and window. This process is carried out in a vacuum bell jar which is placed in an oven. All tube parts are subjected to a temperature which is at least equal to the melting temperature of the ring, in this case indium or a tin-indium alloy.

This means that the radiation-sensitive layer provided on the window is also heated to a temperature higher than 100° C. Radiation-sensitive layers, and in particular photosensitive layers of television camera tubes, however, generally cannot readily withstand such temperatures.

U.S. Pat. No. 3,543,383 discloses a method in which the indium or alloy ring is melted by inductive heating. The ring is present between the window and the bearing surface of the tubular envelope portion. During the inductive heating of the indium ring, the envelope and window are vibrated ultrasonically so as to break the oxide skin present on the indium.

The provision of the indium ring between the window and the bearing surface of the envelope is a problem for those tubes in which the window and the radiation-sensitive layer provided thereon must be positioned very accurately relative to other electrodes in the tube. An example of such a tube is one having a gauze electrode at a short distance from the photosensitive layer. Very narrow tolerances apply as regards plane-parallelism and spacing of the photosensitive layer with respect to the gauze electrode.

In the tube described in U.S. Pat. No. 3,543,383, the indium seal also determines the accuracy of the plane-parallelism and spacing. Moreover, sealing material may flow inward between the window and the bearing surface during the sealing process. As a result of this, undesired electron-optical disturbances may be produced in the operating tube, for example disturbances in the pattern of the electrical field lines.

SUMMARY OF THE INVENTION

It is an object of the invention to provide an electron tube having a window which is accurately positioned axially, and which is hermetically sealed to the tube envelope in a simple manner without heating the radiation-sensitive layer to a temperature which damages the layer.

An electron tube according to the invention has a tubular envelope portion which at one end has a bearing surface normal to the axis of the tube. A window having a radiation-sensitive layer bears on the bearing surface. There is no sealing means in the seam between the window and the envelope. Instead, the seam is sealed hermetically by a mass of indium or an indium alloy on the outside.

According to the invention a metal wire is provided along the circumference of the seam and is embedded in the mass of indium or an indium alloy. The wire is capable of being soldered with indium or an indium alloy. The embedded wire not only increases the mechanical rigidity of the seal, but also enables one to manufacture the seal without heating the radiation-sensitive layer to a temperature which is damaging to the layer. In those cases in which it should be necessary or desirable for reliable operation of the tube, the wire may consist of a nonmagnetic metal, for example copper or a copper-nickel alloy.

In the known methods, so much thermal energy is applied to liquefy the total mass of sealing material that the temperature of the window can rise to a value which is damaging to the radiation-sensitive layer. In order to avoid this, according to the invention, indium or an indium alloy and a metal wire which can be soldered with indium or an indium alloy are provided circumferentially along the seam between the window and the tube envelope. A heat transfer member, which is heated to above the melting temperature of the indium or the indium alloy, is moved along the circumference of the seam to melt the indium or the indium alloy at the area of the heat transfer member.

Thermal energy is applied only locally to the mass of sealing material by the heat transfer member. By causing the heat transfer member to traverse the circumference of the seam the sealing material is melted a portion at a time. The molten sealing material then rapidly cools by giving off thermal energy to the surroundings.

The total amount of thermal energy which is applied to the mass of indium or indium alloy is applied over a longer period of time as compared with the known methods. As a result the temperature of the window does not rise as much as in prior methods. The circumferential metal wire ensures a uniform distribution of the sealing material along the seam and prevents too much sealing material from being taken along with the heat transfer member upon moving the heat transfer member. Without the wire, the seam would be bridged only by a thin skin of sealing material.

According to a further embodiment of the method, the heat transfer member is vibrated ultrasonically while traversing the sealing track. As a result of the ultrasonic vibrations, the oxide skin of the sealing material is broken so that the indium or the indium alloy is strongly bonded to the surfaces of the window and the tubular envelope.

DESCRIPTION OF THE PREFERRED EMBODIMENTS

Figure 1:
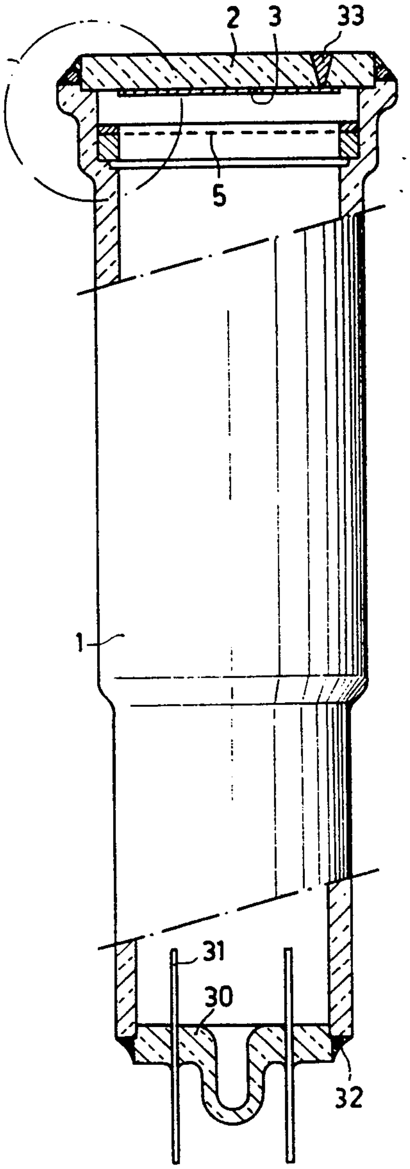
FIG. 1 is a part cross-sectional, part side elevational view of an electron tube according to the invention.
Figure 2:
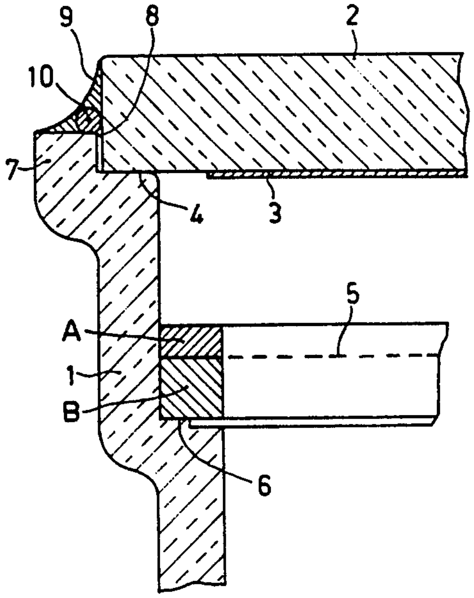
FIG. 2 is an enlarged cross-sectional view of a portion of the tube shown in FIG. 1.

The electron tube shown in FIG. 1 is a television camera tube having a tubular glass envelope 1. Envelope 1 is closed at one end by a glass window 2. The window 2 has a photosensitive layer 3 thereon. Window 2 bears on a bearing surface 4 of the envelope 1. Bearing surface 4 is normal to the tube axis, as shown in FIG. 2 on an enlarged scale.

Components of the tube which are not relevant for explaining the invention, for example an electron gun, are not shown in the drawing.

A gauze electrode 5 is mounted in envelope 1 between rings A and B at a short distance from the photosensitive layer 3. Ring B bears on a bearing surface 6 disposed normally to the tube axis. The bearing surfaces 4 and 6 are precisely parallel to each other and are at a precisely determined distance from each other.

The envelope 1, with the bearing surface 4 and 6, is obtained by drawing a glass tube on a metal mandril according to a technique which is described in British Patent Specification No. 2,026,469 (corresponding to U.S. Pat. No. 4,304,586). Bearing surfaces which are precisely oriented and positioned with respect to each other can be obtained by this technique.

The envelope 1 also comprises an upright flange 7. Flange 7 fixes the position of window 2 radially.

In order to maintain the accuracy in the distance between the photosensitive layer 3 and the gauze electrode 5, the window 2 is laid on the bearing surface 4 without sealing material therebetween. An hermetic seal is instead formed by hermetically sealing a seam 8 formed between the window 2 and the upright flange 7 by using an indium seal 9. A copper wire 10 which extends along the circumference of the seam 8 is embedded in the mass of indium 9. The wire 10 provides not only mechanical rigidity, but also enables one to manufacture the seal without heating the window 2 and hence also the photosensitive layer 3 to a temperature which is damaging to the layer 3.

Figure 3:
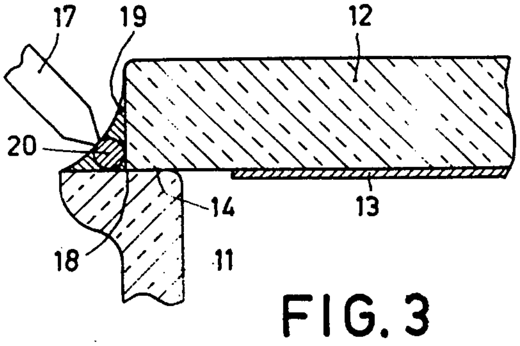
FIG. 3 is an enlarged cross-sectional view of a portion of another embodiment of a window seal according to the invention.

The manufacture of the hermetic seal will be explained with reference to FIG. 3 (which is modified with respect to FIG. 2). The tubular envelope 11 of FIG. 3 does not have the upright flange 7 shown in FIG. 2. Otherwise the seal is analogous to that of FIG. 2.

A window 12 with a photosensitive layer 13 is laid on a bearing surface 14 of envelope 11. Window 12 and surface 14 form a seam 18. A metal wire 20 and a quantity of sealing material 19 are provided around the seam 18. The sealing material 19 may be indium or an indium alloy.

After the wire 20 and material 19 are laid down, a heated heat transfer member 17 is brought into contact with the sealing material 19. As a result, the material 19 melts at the contact area and wets the wire 20 and the adjacent surfaces of the window 12 and the envelope 11. The heat transfer member 17 is moved circumferentially along the seam 18 until the track to be sealed has been entirely traversed.

The advantage of this method is that the sealing material 19 melts only at the area of the heat transfer member 17, while elsewhere the molten sealing material cools rapidly. The total quantity of thermal energy applied to the seal is thus spread over the time in which the heat transfer member traverses the sealing track once. As a result, the temperature of the window remains relatively low.

The wire 20 uniformly distributes of the sealing material 19 along the seam 18. The wire 20 also prevents too much sealing material from being taken along with the heat transfer member 17 upon movement thereof. Without the wire 20, the seam 18 would be bridged by only a thin skin of sealing material.

In order to produce a good wetting of the wire 20 and the surfaces of the window 12 and the envelope 11, the heat transfer member 17 is made to vibrate ultrasonically while traversing the sealing track.

The invention is not restricted to the embodiments described. The sealing material may be indium or an alloy of indium with at least one metal selected from the group consisting of, for example, tin, lead, nickel, gallium, copper, platinum, gold and silver. The wire may consist of any metal which can be soldered to the sealing material. The wire may be provided separately from the sealing material but may also be integrated with the sealing material. In the latter case, for example, the wire may have a sheath of sealing material and be provided in that form around the seam to be sealed.

The seal described may also be used at the end of the tubular envelope portion remote from the window. As shown in FIG. 1, a sealing plate 30 (having electrical leadthrough pins 31) is hermetically sealed to the tubular envelope 1 by a seal 32 in an analogous manner as described with reference to FIG. 3.

It is also possible to provide an indium leadthrough 33 (FIG. 1) in the window or in the envelope of the tube by a heated ultrasonically vibrating heat transfer member. An aperture is made in the window of the tube wall and is filled with a plug of indium. The plug of indium is melted by the heat transfer member and then adheres to the wall of the aperture.

What is claimed is:

1. An electron tube envelope assembly comprising:

a tubular envelope having a first end and an axis, said envelope having a bearing surface at the first end, the bearing surface being perpendicular to the axis;

a window having a radiation-sensitive layer thereon, said window directly contacting the bearing surface of the envelope to form a seam along the junction between the window and the bearing surface; and means for hermetically sealing the seam;

wherein the hermetic sealing means comprises:

a mass of indium solder or an indium alloy solder provided outside the seam and along the circumference of the seam; and a metal wire embedded in the solder, said metal wire capable of being soldered with indium or an indium alloy.

* * * * *